United States Patent [19]

Bux et al.

[11] Patent Number: 4,843,606
[45] Date of Patent: Jun. 27, 1989

[54] LOCAL AREA COMMUNICATION SYSTEM FOR INTEGRATED SERVICES BASED ON A TOKEN-RING TRANSMISSION MEDIUM

[75] Inventors: Werner K. Bux, Richterswil; Felix H. Closs, Adliswil; Johann R. Mueller, Langnau am Albis; Harmen R. Van As, Langnau am Albis; Pitro A. Zafiropulo, Ruschlikon, all of Switzerland

[73] Assignee: International Business Machines Corp., Armonk, N.Y.

[21] Appl. No.: 937,591

[22] Filed: Dec. 3, 1986

[30] Foreign Application Priority Data

Dec. 23, 1985 [EP] European Pat. Off. ............ 85116504

[51] Int. Cl.⁴ .............................................. H04J 3/16
[52] U.S. Cl. ......................................... 370/89; 370/55
[58] Field of Search .................... 370/85, 89, 95, 13, 370/118; 340/825.5

[56] References Cited

U.S. PATENT DOCUMENTS 4,539,679 8/1985 Bux et al. ............................... 370/89
4,592,044 5/1986 Ferene et al. .......................... 370/13
4,674,086 6/1987 Szczepanek et al. .................. 370/89
4,680,757 7/1987 Murakami et al. .................... 370/89

Primary Examiner—Robert L. Griffin
Assistant Examiner—Frank M. Scutch, III
Attorney, Agent, or Firm—Joscelyn G. Cockburn; John B. Frisone

[57] ABSTRACT

In a local area communication system comprising token rings (11) with synchronous bandwidth managers SBM (15) for issuing priority tokens for quasi-synchronous frames at regular intervals, the rings are interconnected by a time division muliplex PBX unit (21) via their SMB units. Buffers are provided in each SBM for synchronous information blocks transferred from and to the ring, and the TDM control (31) can independently access these buffers for TDM switching of the individual bytes of said information blocks. Besides this PBX interconnection for synchronous information or voice, the rings are also interconnected by a backbone bus or ring for transfer of asynchronous data between rings. A special slot rearrangement procedure is provided to improve the filling of time slots in the quasi-synchronous frames that are no longer used after release of a connection, to allow for adapting the frame length (number of issued slots) to the number of existing connections.

15 Claims, 9 Drawing Sheets

FIG. 6A BUFFER ACCESS CONTROL FOR VOICE PACKETS

K = NUMBER OF VOICE SLOTS PER FRAME
N = NUMBER OF BYTES PER VOICE PACKET / SLOT

LOCAL AREA COMMUNICATION SYSTEM FOR INTEGRATED SERVICES BASED ON A TOKEN-RING TRANSMISSION MEDIUM

FIELD OF INVENTION

Present invention relates to local area communication systems based on a token-ring transmission medium, and in particular to such a communication system which is designed for integrated services, i.e. for the asynchronous transmission of information such as data files as well as for the synchronous transmission of voice or real-time data.

BACKGROUND

Ring communication systems which use a token mechanism for access to the transmission ring and which allow asynchronous as well as synchronous transmission of information are well known already, e.g. from the following patents and publications:

U.S. Pat. No. 4,429,405 entitled "Method of transmitting information between stations attached to a unidirectional transmission ring". - U.S. Pat. No. 4,482,999 entitled "Method of transmitting information between stations attached to a unidirectional transmission ring". - U.S. Pat. No. 4,539,679 entitled "Synchronization in a communication network of interconnected rings". - W. Bux et al.: "A local-area network based on a reliable token-ring system"; published in "Local Computer Networks", North-Holland Publ. Co. 1982, pp. 69-82. - N. C. Strole: "A local communication network based on interconnected token-access rings: A tutorial", IBM Journal of Research and Development, Vol. 27, No. 5, September 1983, pp. 481-496.

In the systems disclosed in above cited patents and publications, priority tokens are issued at regular intervals to allow the transmission of such information which needs a synchronous transmission service. If the synchronous information, e.g. digital voice samples, is to be transferred between different rings which are interconnected by bridges, or between a ring and another network through a gateway unit, additional delays may be encountered in these bridges or gateways which is undesirable for this type of information.

For the transmission of synchronous information, other ring systems are known which are of the slotted or time division multiplex type in that they use a fixed time raster of slots and frames. Examples of such systems are given in the following patents: U.S. Pat. No. 4,154,983 entitled "Loop carrier system for telecommunications and data services". - Swiss Pat. No. 502,043 entitled "Communication system, particularly telephone system, for time division multiplex operation". These systems, though well-suited for the transmission of voice between attached stations, are less effective for the transmission of data blocks or files of irregular length because of the fixed time raster or TDM scheme.

Exchange systems of the PBX type for time division multiplex switching of voice or data between a number of ports were disclosed e.g. in the following patent and publications: U.S. Pat. No. 3,856,993 entitled "Time division multiplex exchange". - J. M. Kasson: "The Rolm computerized branch exchange: An advanced digital PBX", Computer, June 1979, pp. 24-31. - J. M. Kasson et al.: "The CBX II switching architecture", IEEE Journal on Selected Areas in Communications, Vol. SAC-3, No. 4, July 1985, pp. 555-560. None of the switching systems disclosed provides for the immediate interconnection to a ring network with basically asynchronous operation or with a token access mechanism.

OBJECTS OF THE INVENTION

It is a primary object of the invention to enable, in a local area communication system using the token ring as basic transmission medium, the immediate switching of synchronous information between such rings.

It is a further object of this invention to enable the attachment of several token rings to a TDM switching unit of the PBX type, without interference of the token access mechanism with the TDM switching operation.

Another object of the invention is to speed up the transmission of voice signals or other synchronous information between interconnected local area token ring networks.

A further object is a token-ring based local communication system which enables an improved integration of services in a system of interconnected token rings.

Another object is a method of dynamic reassignment of voice slots in synchronous frames of a token ring system for improving the bandwidth utilization by minimizing the required length of synchronous frames.

SUMMARY OF THE INVENTION

These objects are achieved by the invention which provides, in a communication network comprising at least one token ring with a synchronous bandwidth manager unit (SBM) for issuing priority tokens to enable the transmission of synchronous information, a time division multiplex (TDM) exchange which is connected to each ring by the respective SBM unit; said SBM unit extracting all information blocks from each priority frame and transferring them to said TDM exchange, and inserting information blocks received from said TDM exchange into priority frames it transmits on the ring, each priority frame having a plurality of time slots for information blocks; each station which is to participate in synchronous information transfers having means for receiving such an information block from, and transmitting such an information block in, at least one predetermined time slot of each priority frame.

In a specific embodiment, a system according to the invention has a plurality of token rings which are interconnected through bridges by a backbone ring or bus for the transfer of information units from asynchronous frames, whereas the common TDM exchange also interconnected the rings only transfers information units from priority or synchronous frames.

For improving the bandwidth utilization, the invention provides for a dynamic slot rearrangement procedure in which two slots are simultaneously used during a transitional time interval for transmitting the same synchronous information units, to enable a safe transition from one slot to another.

When using this arrangement and method, synchronous information units such as packets of voice samples can be fast transmitted between stations, avoiding undue delays and utilizing the advantages of digital time division multiplex exchanges. With the special slot rearrangement procedure, any gaps in priority or synchronous information frames are avoided and these frames can be kept as short as possible without requiring a reassignment of buffers or change of connection tables in the TDM exchange used.

Thus the invention allows to combine, in a communication system, the token ring access medium with a TDM PBX exchange to achieve a versatile local area network for interconnecting a large number of stations and for offering integration of different types of services.

Further features and advantages of the invention will become apparent from the following detailed description of a preferred embodiment in connection with the accompanying drawings.

DETAILED DESCRIPTION

(1) SYSTEM OVERVIEW

Figure 1:
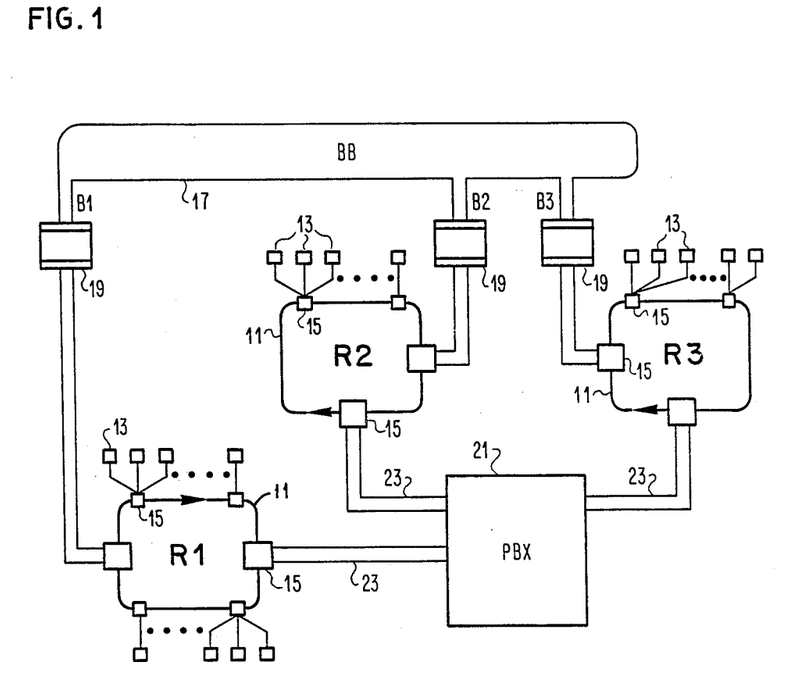
FIG. 1 shows the structure of a multiple token ring local area communications network with an interconnecting PBX unit, in which the invention is used.

FIG. 1 represents the structure of a ring communication system in which the present invention is used. The system comprises several basic rings 11 (R1, R2, R3) to which stations 13 are attached via distribution panels 15 (DP). Each station may be a data terminal, a computer, a telephone station or similar equipment. The rings are interconnected by a backbone ring 17 (BB) via bridges 19 (B1, B2, B3). A token mechanism is used for regulating access of stations to the rings. Such systems are known and were described already in the above-mentioned publications and U.S. Patents.

The novel feature of present invention is that all rings are also interconnected via a PBX system (private branch exchange) 21. The PBX system is attached to each ring also by a distribution panel 15 and extension lobe 23 like all other stations.

In the system shown in FIG. 1, asynchronous data are transferred between rings R1 . . . R3 over the backbone ring BB, with intermediate storage (buffering) in the bridges. Data for which source and destination are on the same ring are of course never transferred over a bridge or the backbone. Synchronous information (e.g. voice), however, is transmitted over and switched by the PBX unit (also for traffic between stations which are attached to the same ring).

As is known for token ring systems, tokens are issued asynchronously or at irregular intervals for transmission of data; priority tokens for transmission of synchronous information are issued at regular intervals (quasi-synchronous) by a station in each ring which is called the synchronous bandwidth manager (SBM). In the novel system of present invention, this SBM of each ring is not a separate station but rather a special unit that is closely attached to the PBX. Therefore, it is not shown in FIG. 1 but only in more detailed block diagrams of the PBX in FIG. 3 and of the SBM unit per se in FIGS. 4 and 5. The basic function of a synchronous bandwidth manager, i.e. issuance of a priority token at regular intervals for synchronous information transfer, is also exercised by these PBX-attached SBMs.

(2) FRAME FORMAT FOR SYNCHRONOUS INFORMATION TRANSMISSION

The synchronous information frames of the described system are mainly used for voice transmission between telephone stations, and therefore the following description uses the terms "voice frame", "voice transmission", etc. The frames can, however, as well be used for any other kind of synchronous information, e.g. measuring values or process control data.

Figure 2:
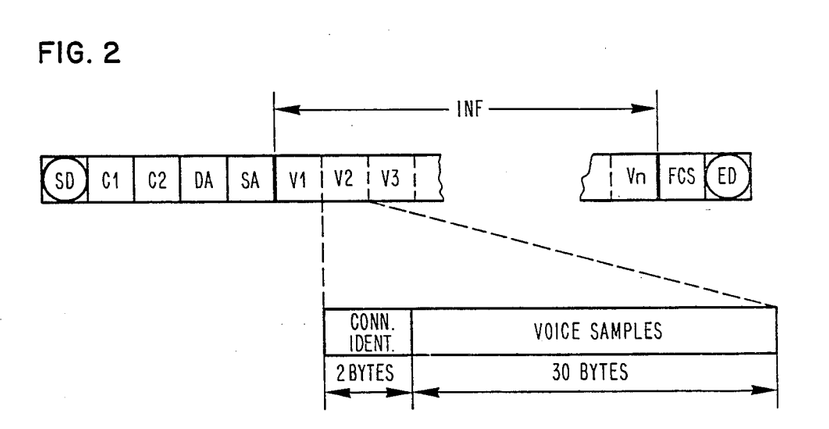
FIG. 2 depicts the typical frame format for the transmission of voice or synchronous information in accordance with the invention in a system as shown in FIG. 1.

The format of asynchronous frames on the rings are well-known, e.g. from standards IEEE 802.5 and ECMA 89. The principle format of the voice frames used in this system is shown in FIG. 2. Basically, it corresponds also to the above-mentioned standards. It has a start delimiter SD, an access control field C1, a frame control field C2, a destination address DA, a source address SA, an information field INF, an optional frame check field FCS, and an end delimiter ED.

Access control field C1 has the normal structure with contents PPPTMRRR, i.e. three priority bits, one token bit, one monitor bit, and three reservation bits. The SBM unit has the second highest priority (110), and each synchronous frame has the third highest priority (101).

Access control field C2 also has the normal structure with contents FFZZZZZZ. The two format bits FF have the following meaning: 00=MAC frame, 01=LLC frame, 10 =reserved (synchronous data or signaling data), and 11=voice. The first Z bit (Z1) has an escape function: if it is 1, the following five Z bits (Z2 . . . Z6) have the meaning given below; if it is 0, the following five Z bits are undefined.

| Z2 | Z3 | Z4 | Z5 | | Z6 |
|----|----|----|----|----|----|
| 1 | . | . | . | = | Addressed |
| 0 | . | . | . | = | Non-Addressed |
| x | 0 | x | x | x | = | Full Duplex |
| x | 1 | x | x | x | = | Half Duplex |
| x | 1 | 0 | x | x | = | Half Duplex, Read |
| x | 1 | 1 | x | x | = | Half Duplex, Write |

The destination address DA in all voice frames is a non-functional group address, not an individual station address. It designates e.g. all voice terminals of a given class or the group of voice terminals attached to one multiplexer.

The source address SA in all voice frames is the address of the SBM unit at the PBX, because this unit issues all voice (synchronous) frames and also removes them from the ring.

The information field INF in each voice frame has a special structure. It comprises a variable number of voice slots V1 ... Vn of fixed length, e.g. 32 bytes each. The number of voice slots depends on the number of presently active synchronous connections and is determined by the SBM unit of each ring, which issues the voice frames.

As the digital voice samples occur at a much higher rate (every 125 μs) than the voice frames on the ring (e.g. 500 per second), voice samples of each station or terminal are accumulated to form a voice packet of several bytes which is then transmitted in the next voice frame over the ring (to the PBX, and vice versa).

Two different implementations of the voice transmission in priority frames are considered in the described system: In the first, voice packets have no address or identifier; rather, a specific voice slot (number) is assigned to each connection, and voice packets for this connection are always inserted into the same slot (number) in each voice frame. In the second implementation, each voice packet carries with it a connection identifier CID (like an address); voice packets for a connection can occur in any one slot in a voice frame as they can be recognized by their identifier.

The frame format in FIG. 2 shows for one voice slot (V2) its structure in the second implementation: 2 bytes are used for the identifier CID, and the remaining 30 bytes are used for a voice packet which comprises 30 samples. In the first implementation (without identifier CID) all 32 bytes of each voice slot can be used for voice samples (i.e. each voice packet can contain 32 bytes). If necessary, the first slot V1 of the information field in each voice frame can be used for common control information (e.g. for signaling purposes). These numbers are examples and can of course be modified depending on system requirements etc.

(3) PBX STRUCTURE

Figure 3:
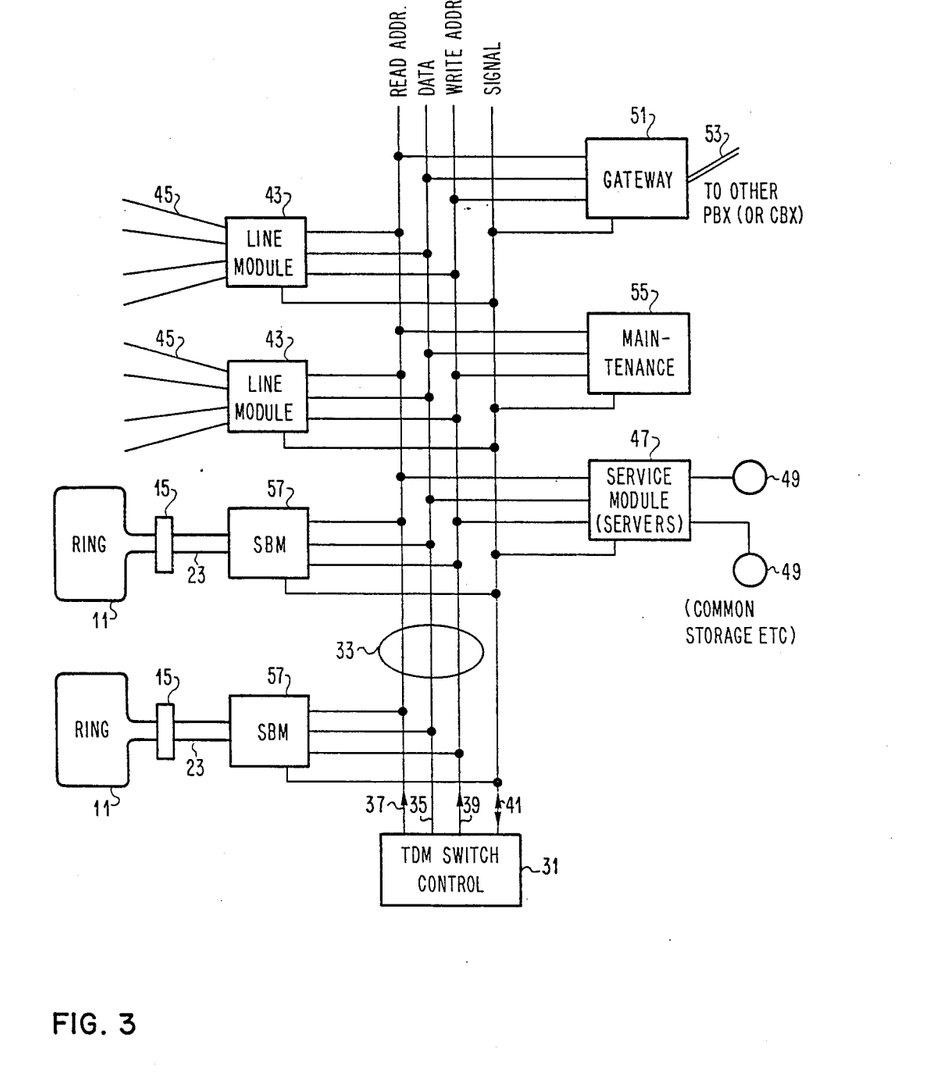
FIG. 3 shows the basic structure of the private branch exchange (PBX) unit used in the system of FIG. 1.

The structure of the PBX unit (private branch exchange) which is used in present system is shown in FIG. 3. A more detailed description of such a PBX unit (of course without ring attachments or SBMs) is given e.g. in the publication by J. M. Kasson on PBX systems which were mentioned above already.

The PBX comprises a TDM switch control 31 and a TDM bus arrangement 33 by which several attached modules are connected to switch control 31. The bus arrangement comprises a TDM data bus 35 for transferring voice samples (individual bytes) between buffers in the modules, a read address and enable bus 37 for addressing buffers in the modules for read-out of voice samples to the data bus, and a write address and enable bus 39 for addressing buffers in the modules for writing-in voice samples from the data bus. Furthermore, a signaling bus 41 is provided for exchanging signaling and control information between the TDM switch control and the various modules.

The following modules are shown in FIG. 3: Two line modules 43 each for connecting a given number of voice lines 45 (telephone subscriber loops) to the PBX. These modules buffer incoming and outgoing voice samples and transfer the necessary signaling information between the attached stations and the PBX. A service module 47 provides the necessary service functions required in a PBX (such as voice messaging, conference calls, accounting) with the aid of servers 49. Another module 51 is provided as a gateway of other PBXs or to a CBX to which the shown PBX is connected by a trunk line 53. Still another module 55 is provided for maintenance and network management tasks.

For implementing present invention, a plurality of SBM modules 57 is provided, each for connecting a token ring 11 to the PBX via a distribution panel 15 and an extension lobe 23. A distribution panel 15 can of course also be housed in the PBX box. Thus, an SBM module is connected to its loop like a normal station, and to the PBX bus like one of the other modules. More details of the SBM modules are given in connection with FIGS. 4 and 5.

Swtiching of voice samples between buffers in the PBX modules occurs as follows: The TDM switch control has tables for all existing connections, which tables contain for each connection an identification of the buffers from which incoming voice samples can be read and into which outgoing voice samples are to be written. At appropriate times, TDM switch control 31 issues on address bus 37 a read address and an enable pulse to cause readout of one voice sample (from a buffer in any one of the modules) to a specific time slot on the TDM data bus 35, and on address bus 39 a write address and an enable pulse to cause transfer of the voice sample from the respective voice slot on TDM data bus 35 to the receiving buffer (in any one of the modules).

(4) DETAILS OF SBM MODULE

Figure 4:
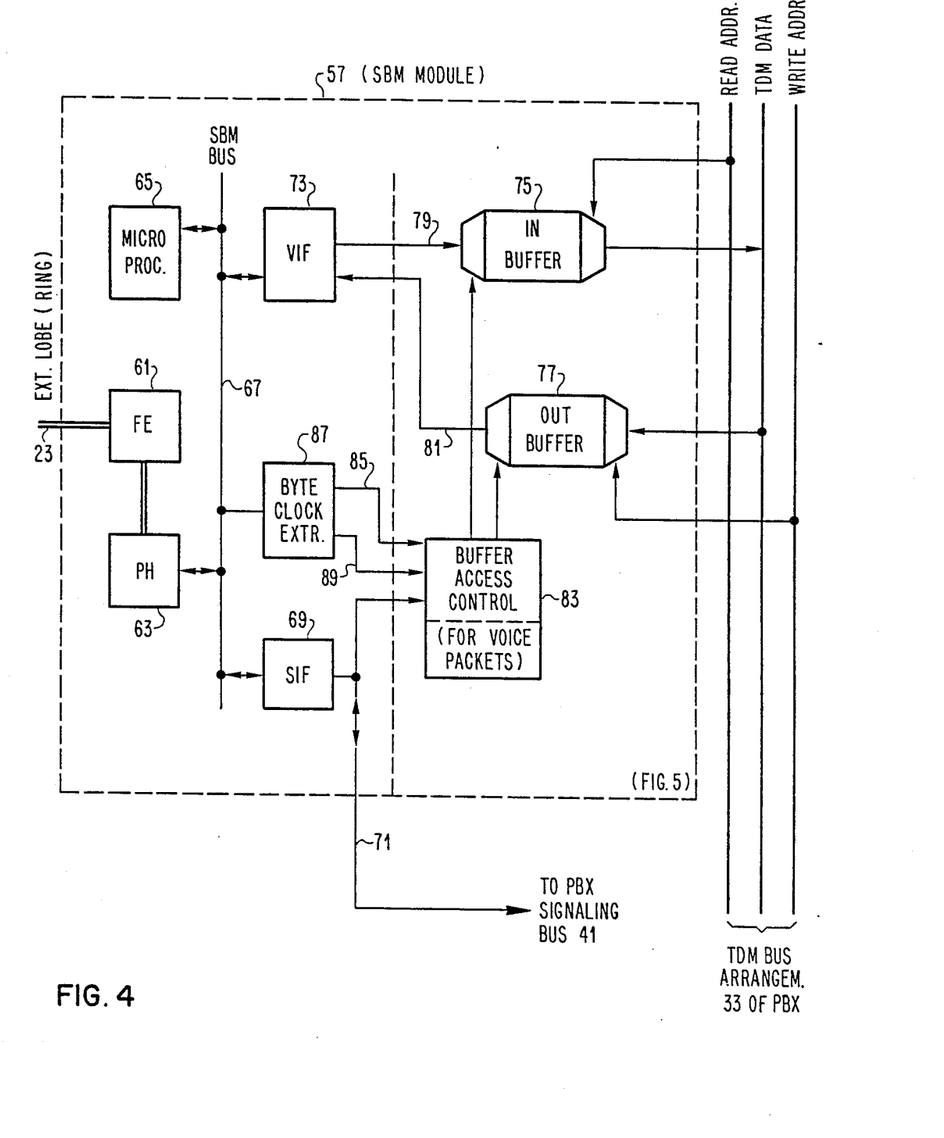
FIG. 4 is a block diagram of a synchronous bandwidth manager (SBM) unit by which a token ring is interconnected to the common PBX unit in the system of FIG. 1.

Some details of an SBM module 57 for interconnecting a token ring to the PBX are shown in the block diagram of FIG. 4. At the input of the SBM module, the extension lobe 23 of the ring is connected to front end circuitry 61 which decodes the ring signals, provides clock extraction, protection, etc. and adapts the other SBM circuitry to the timing of the ring signals. Attached to the front end circuitry is a protocol handler 63 which recongnizes start and end delimiters and the different portions of a received frame, handles access to the ring by evaluating the token (priority), etc. A microprocessor 65 is connected to the protocol handler 63 and to the other SBM circuitry by an SBM bus 67 (DMA bus). This processor does the necessary data processing operations for the various units in the SBM. A signaling interface 69 stores and evaluates signaling information received in asynchronous frames from the ring for establishing, maintaining, and releasing a connection and provides signaling information on output lines 71 to the PBX signaling bus 41; other signaling information (from PBX to ring) is transferred in the reverse direction through the signaling interface 69.

A voice interface 73 is provided for reformatting and intermediate storage of the voice packets which are transferred between the ring and the PBX. It is connected on one side to SBM bus 67, and on the other side to voice packet buffer arrays 75 and 77 by lines 79 and 81, respectively. These buffer arrays adapt the somewhat irregular (quasi-synchronous) flow of voice packets from and to the ring to the strictly synchronous flow of voice bytes (samples) to and from the PBX. Each array comprises a number of dribble-down or FIFO buffers for accepting voice packets and delivering single voice bytes, and vice versa, as will be explained in the next section.

Accessing of these buffers from the ring side is controlled by buffer access control 83 which generates the necessary addresses and timing or enabling signals for the buffer arrays. This access control 83 is also connected to output lines 71 of the signaling interface 69 (to receive information on establishment of connections and assigned buffers), and by lines 85 and 89 to a byte clock extraction circuit 87 (to receive a ring byte clock, and a pulse marking the start of each received voice information field) for enabling proper synchronization of buffer accesses with the voice packet streams furnished from and to the ring.

Accessing of the buffers in arrays 75 and 77 from the PBX side is controlled by addressing and enabling signals furnished on TDM address busses 37 and 39. The data input/output on the PBX side of the buffers is of course connected to the TDM data bus of the PBX.

The FIFO buffers can be implemented in different ways. One possibility is to use dribble down-buffers in which writing and reading can occur with different, unrelated clocks, and which are available as hardware modules. Another possibility is to use a random access memory (RAM) which is organized by software to function as a plurality of first-in first-out buffers (using recirculating pointers for indicating the current writein and read-out locations).

(5) DETAILS OF SWITCH BUFFERS

Figure 5:
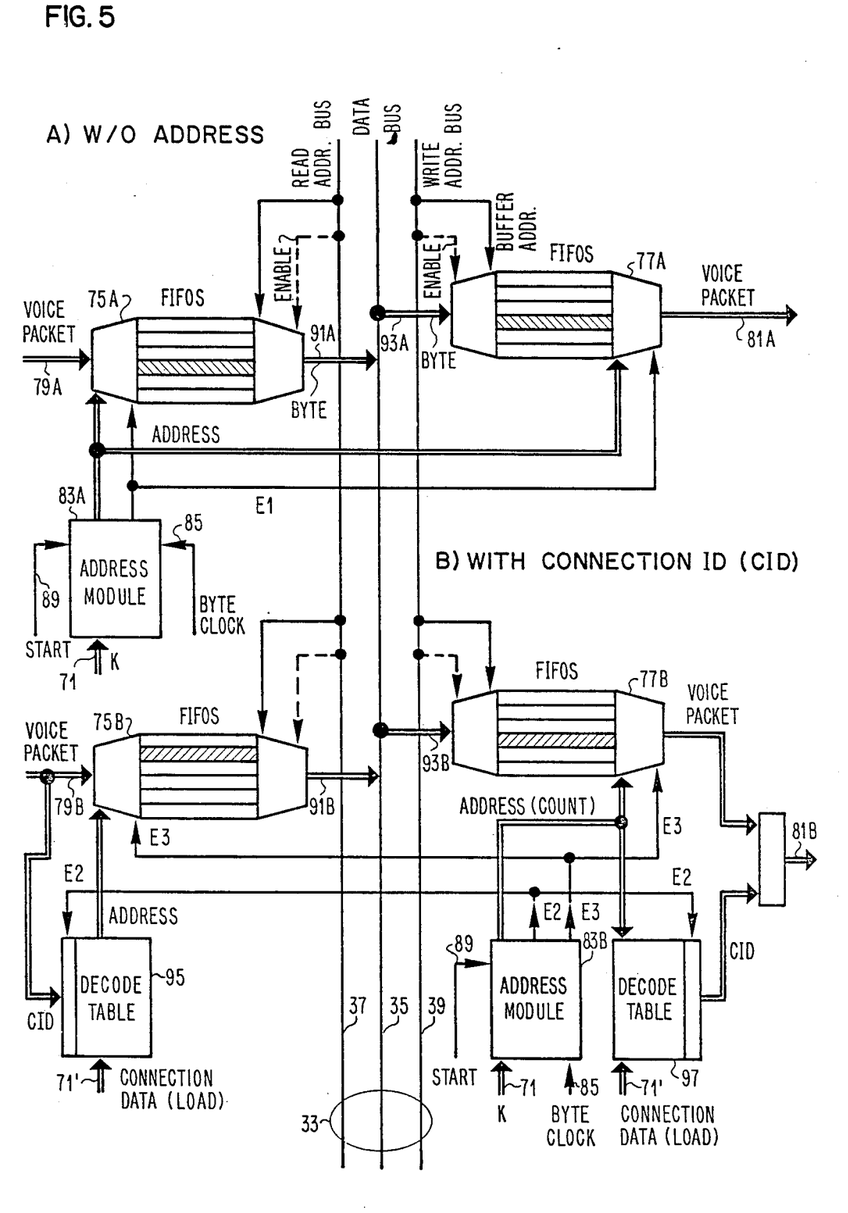
FIG. 5 is a block diagram of the switching buffer arrays and their access control circuitry, as comprised in the SBM unit of FIG. 4.

FIG. 5 depicts in a block diagram some more details of the switch buffer array section of the SBM module. To simplify the illustration, input buffers (voice stream from the ring into the PBX) are shown on the left side of the TDM bus arrangement 33, and output buffers (voice stream from the PBX to the ring) are shown on the right side. It should be noted that in FIG. 5, two somewhat different implementations are presented: In the upper portion (A) for voice transmission without addresses, and in the lower portion (B) for voice transmission with connection identifiers CID. These two different techniques were explained in section 2 above.

(A) Voice Transmission Without Address:

FIFO buffer array 75A is connected to line 79A to receive a stream of voice packets from voice interface 73. Write-in occurs as follows under control of buffer access control 83A: After the start of a voice field (voice packet train in a voice frame) the buffers of array 75A are addressed in sequence from top to bottom (one being highlighted in the drawing), and while any one buffer is addressed, a sequence of N enable pulses E1 is given; thus, N consecutive voice bytes, i.e. one voice packet, are written into each FIFO buffer. The same happens in an analogous manner at the output side of buffer array 77A for reading out voice packets (N consecutive voice bytes each) to the line 81A which transfers a continuous voice packet stream to voice interface 73.

Read-out of individual bytes from selected buffers in array 75A on line 91A to the TDM data bus, and writein into selected buffers of array 77A from the TDM data bus on line 93A is controlled by addresses and enable pulses which are furnished by TDM switch control 31 on busses 37 and 39 as was explained above already. Addressing of individual buffers occurs in random order, depending on the slot assignments of the TDM switch control.

(B) Voice Transmission With Connection Identifier CID:

FIFO buffer 75B and a decode table 95 are connected to line 79B to receive a voice packet stream from voice interface 73. Under control of buffer access control 83B, after the start of a voice information field (train of voice slots), the first two bytes of each slot which are the connection identifier CID are transferred with the aid of two enable pulses E2 to decode table 95 which converts the CID into an assigned buffer address which is then used to address one buffer in array 75B. This address is maintained for the next successive (N-2) byte times. A sequence of N-2 enable pulses E3 is furnished to the input of array 75B to thus cause write-in of N-2 consecutive voice bytes (one packet) into the addressed buffer. The packets of one voice frame on the ring (i.e. a train of voice slots) are thus distributed in random order to the buffers in the array (depending on assignments between CIDs and buffers).

Read-out from buffer array 77B is as follows: Buffer access control 83B issues the addresses of the buffers in sequence, i.e. from 0 to K-1 (like a counter). Each address is maintained during N byte times, and is also furnished to a decode table 97. During the first two byte times, two enable pulses E2 are furnished to decode table 97 which converts the given address into a two-byte connection identifier CID which is transferred to line 81B. Thereafter, (N-2) consecutive enable pulses E3 are furnished to the access mechanism of buffer array 77B to achieve read-out, from the addressed buffer, of N-2 consecutive voice bytes, i.e. one voice packet, to line 81B. A stream of K voice packets each preceded by a corresponding call identifier is thus transferred on line 81B to voice interface 73.

Transfer of individual voice bytes from buffer array 75B to the TDM data bus 35, and from this bus into buffer array 77B is done in the same way as explained above already for case (A).

Decode tables 95 and 97 need not be provided as separate units. They can as well be incorporated into buffer access control 83B, or even into the signaling interface (SIF) 69.

Figure 6A:
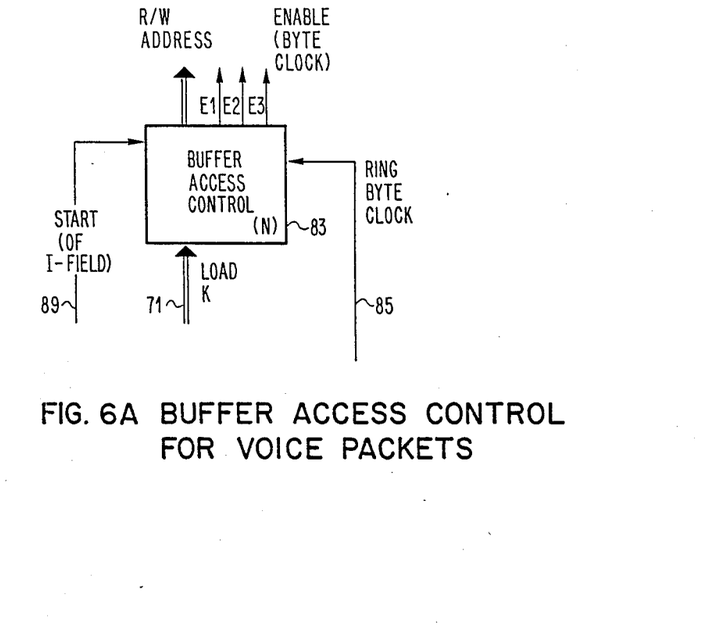
FIGS. 6A and 6B are a schematic representation and timing diagram of the signals used for controlling access to the buffer arrays of FIG. 5.

In FIG. 6A, a block diagram of the buffer access control unit 83 is shown, identifying the various input and output lines. Its function should be clear from above description. The unit has inherently stored the number of bytes per voice slot (N). The current number of slots per voice frame (K) is transferred into the buffer access control on line 71 from signaling interface 69; this number can change from frame to frame.

Figure 6B:
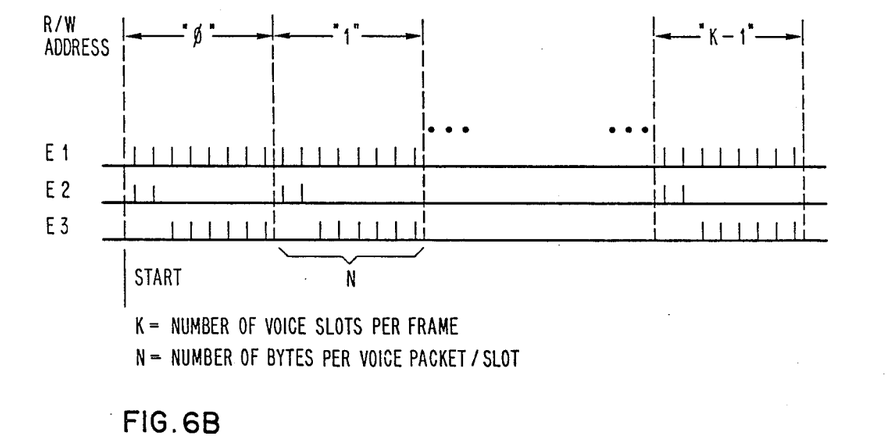

FIG. 6B is a timing diagram that shows the mutual relation of pulse signals E1, E2, and E3 and of the addresses which are furnished by buffer access control 83.

(6) VOICE PACKET BUFFERING AND ASSEMBLY/DISASSEMBLY IN VOICE STATIONS

As was mentioned above, each voice station collects the digital voice samples (individual bytes) to form voice packets each having 32 (or 30) bytes for transmission on the ring. Vice versa, voice packets received from the ring are disassembled in a voice station and released as individual bytes at the sampling rate.

Figure 7:
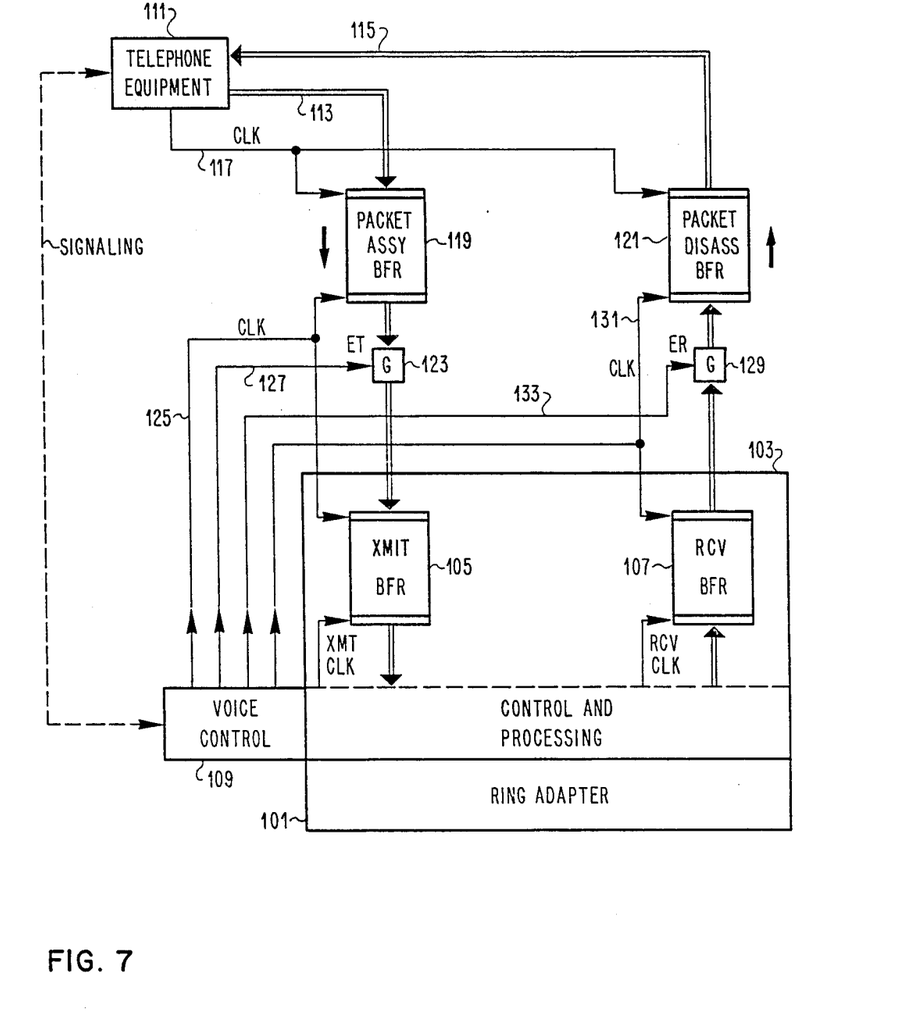
FIG. 7 is a block diagram of the buffering arrangement used for voice or synchronous information in a station attached to the token ring.

The required buffering structure for a voice station is shown in FIG. 7 as a block diagram. A voice station comprises at least a ring adapter unit 101, station equipment 103 comprising a processor, interfaces, and storage (not shown) like any normal station, and further voice packet transmit and receive buffers 105 and 107 and some extra voice control 109 of which only the functions relative to buffering will be explained. The station further comprises a digital telephone terminal 111 which furnishes voice samples (bytes) at the 8 kbit/s sampling rate on lines 113 and accepts voice samples on lines 115. The clock signal which is anyway required for sampling is made available on clock line 117.

For voice packet assembly and disassembly, two FIFO buffers 119 and 121 are provided. Assembly buffer 119 receives the stream of voice samples on lines 113. They are written into the buffers continuously under control of the sampling clock signal. Disassembly buffer 111 furnishes a stream of individual voice bytes on lines 115, which are read out under control of the voice sampling clock. These assembly/disassembly buffers can be implemented either as dribble-down buffers or as pointer-addressed memories (as was mentioned for the switch buffers in the SBM unit).

The voice packet transmit and receive buffers 105 and 107 are implemented as shift registers and transmit or receive voice packets in burst mode to or from the ring adapter. One voice packet containing e.g. 32 voice samples must be transmitted to and received from the ring every 4 ms (250 per second).

The packet assembly buffer 119 is connected to the packet transmit buffer 105 by a gate 123 which is opened every 4 ms for the burst transfer of one voice packet. Read-out from the assembly buffer and write-in into the transmit buffer is controlled by a sequence of transfer clock pulses of e.g. 8 times the sampling clock frequency, i.e. 64 khz, furnished by voice control 109 on line 125. The clock pulse sequence and thus the transfer burst have a duration of 500 $\mu$s (32 pulses). A transmit transfer enabling signal ET of the same duration is furnished on line 127 to gate 123.

The packet disassembly buffer 121 is connected to the packet receive buffer 107 by a gate 129 which is also opened every 4 ms for the burst transfer of one voice packet, which occurs under control of clock pulses on line 131 and a receive transfer enabling pulse ER on line 133, in an analogous manner as was explained for the packet transmission in the other direction.

Duration and speed of the burst transfers can of course be differently selected. The transfers must be so timed that they do not collide with packet transfers between the transmit/receive buffers 105/107 and the ring. For a different number of voice samples per packet (e.g. 30 for addressed packets), the packet transmission rate must of course also be differently selected (to fit the voice sampling rate). To enable proper operation of the packet assembly/disassembly buffers 119 and 121 they must have an appropriate capacity, e.g. 96 bytes or three packets, to compensate irregularities in the transmission of voice frames on the ring. At the start of operation, each of these two buffers must be about half-filled. As this is a standard measure for buffer operations, no details need be given here.

(7) ASSIGNMENT OF VOICE SLOTS, AND VOICE FRAME LENGTH ON RING

As was explained in Section 2 above, two different implementations of voice packet transmission are supported:

Without addresses or identifiers: Slot assignment is known to voice stations, they must find assigned slots.

With connection identifier: Slot assignment can be random; not slots but packets are recognized by stations.

For the latter implementation (with identifiers), each voice frame always has exactly the same number of slots as connections exist and as voice packets are transmitted. No gaps can occur. Therefore, no further discussion is made here.

For the first implementation (without identifiers or addresses), there exists the possibility of gaps or empty slots after release (termination) of connections. Two different methods of filling such gaps are considered for the present system, which are explained below:

(A) Fixed Slot Assignment, No Slot Rearrangement

This method was used in the example described in connection with FIG. 5. When a connection is established, a particular slot (number) is assigned to it and is not changed during the whole connection. A switch buffer in the SBM (PBX module) is also assigned to a connection at the beginning and this assignment is not changed during the whole connection (because the PBX switching operation relies on this buffer assignment).

Filling of gaps occurs as follows: When a new connection is to be established and one or more gaps (free slots) exist in current voice frames (due to prior release of some connections), the free slots are assigned to new connections starting with the lowest-numbered (earliest occurring) free slot. If a connection is released that occupied the last slot of voice frames, this slots will be cancelled from future voice frames, i.e. the length of issued voice frames will be decreased. If a new connection is to be established and no gaps (free slots) exist, an additional voice slot is appended to the information field of future voice frames, thus the length of voice frames is only increased if no free slots are available.

With this method, no rearrangement of voice slot assignments is necessary during a connection. However, voice frames may have empty slots for some time; but in a period of a decreasing number of connections, occupied slots will "propagate" towards the beginning of the frame, empty slots will be eliminated at the end, and the voice frames will become shorter.

(B) Rearrangement of Voice Slots to Avoid Gaps

According to this method, a rearrangement is made when a voice slot becomes free, by newly assigning this slot to that connection which is currently using the last slot of each voice frame. This last slot can then be eliminated and the future voice frames will be shorter by one voice slot.

It is assumed here that the voice slot which became free is slot number 3; the slot from which the change is to be made is designated as slot number n (it was the last slot of each frame).

Basically, the procedure is as follows: During a transitional period, voice packets for the respective connection are transferred in duplicate in two slots per frame, i.e. in the old assigned slot (Sn) and in the slot to be assigned newly (S3). After detecting that transmission in the new slot occurs correctly, the change-over is made and the old slot (Sn) is not used any more.

Figure 8:
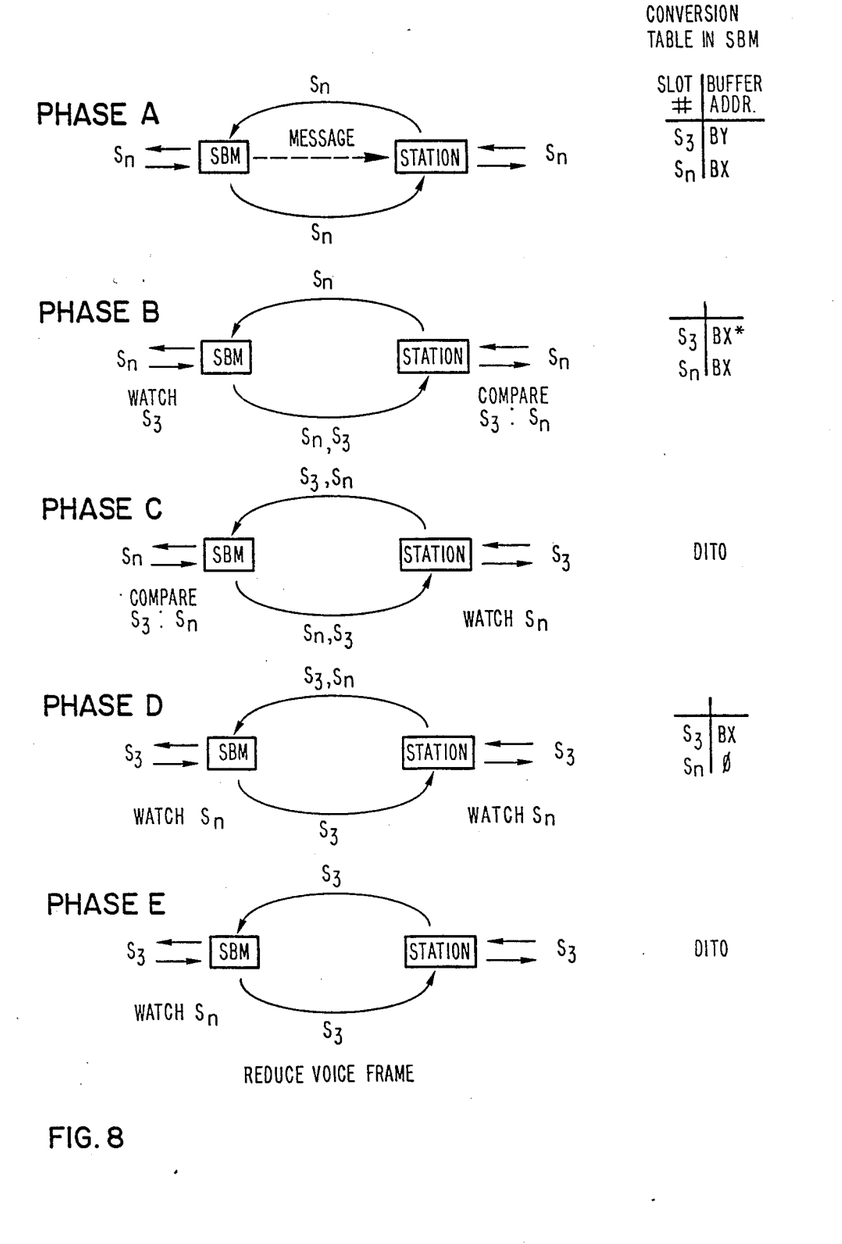
FIG. 8 is a schematic representation of the novel dynamic slot rearrangement procedure when transmitting voice on the ring between a station and the SBM unit.

The actual procedure is explained in connection with FIG. 8. The figure shows schematically the five phases of the slot rearrangement procedure. The slot numbers (Si) with the double arrows at the left and right of each partial figure show which slot is actually used (by the SBM and by the station involved) for voice packet transfers. The slot numbers at the bowed arrows in the middle of each partial figure show in which slot or slots voice packets are transferred (identical contents in both slots if two slot numbers are shown). At the right side of each partial figure there are shown the entries of the conversion table in the SBM which are used for this connection in the different phases. The left column shows the slot number which is used to address the table when the respective slot appears, and the right column shows the buffer address (Bi) of the switching buffer to which or from which voice packets for the respective connection are written and read, respectively.

The following occurs in the different phases:

Phase A: Slot S3 which was used for the released connection to which buffer BY was assigned became free. The connection for which the reassignment is to be made uses at present slot Sn and buffer BX (the buffer assignment will not be changed). The SBM notifies the station involved by a signaling message that the reassignment procedure is started and that slot S3 is the target of the change. The SBM then replaces the buffer address stored in the S3 entry to BX so that (for the next phase) buffer BX will be accessed in two slot times: S3 and Sn.

Phase B: The SBM now transmits equal voice packets in S3 and Sn (because of the table contents). Reception of voice packets from slot S3 into buffer BX is prevented during this phase by an inhibiting gate (as will be shown later). The station will receive the equal voice packets in both slots and compare them but will actually use only packets from slot Sn. The station itself transmits only in slot Sn. When the comparison in the station was positive for a predetermined number of times (e.g. three times), the station will switch over to use (in the next phase) the contents of new slot S3 only, and will start transmitting equal voice packets in slots S3 and Sn.

Phase C: The SBM, after recognizing (by receiving also voice packets in slot S3) that the station switched over, will then receive the equal voice packets in both slots and compare them, but will use only those from old slot Sn. After the predetermined number of successful comparisons, the SBM will switch over by doing the following: It will change the conversion table entries for Sn to zero and will make the table entry BX for S3 effective not only for voice packet transmission but also for voice packet reception.

Phase D: During this phase, the SBM will use only S3; empty slots Sn will be transmitted from the SBM. The station watches the contents of Sn and will recognize that the switchover occurred in the SBM by receiving the empty slots. It will then also stop, at the end of this phase, the duplicate transmission so that empty slots Sn will return to the SBM.

Phase E: In this last phase, the SBM watching the old slot Sn recognizes that Sn remains empty. It knows now that switchover is complete and will start to transmit shorter voice frames (reduced by one voice slot).

It should be noted that the switching buffers 75 and 77 in the SBM module of the PBX are not reassigned. They remain the same throughout the duration of a connection (because the PBX switching operation relies on it). The change-over is rather done by changing the contents of connection data (conversion tables) used for addressing switching buffers: The same buffer number is associated with the old slot number prior to changeover and with the new slot number immediately after change-over.

Figure 9:
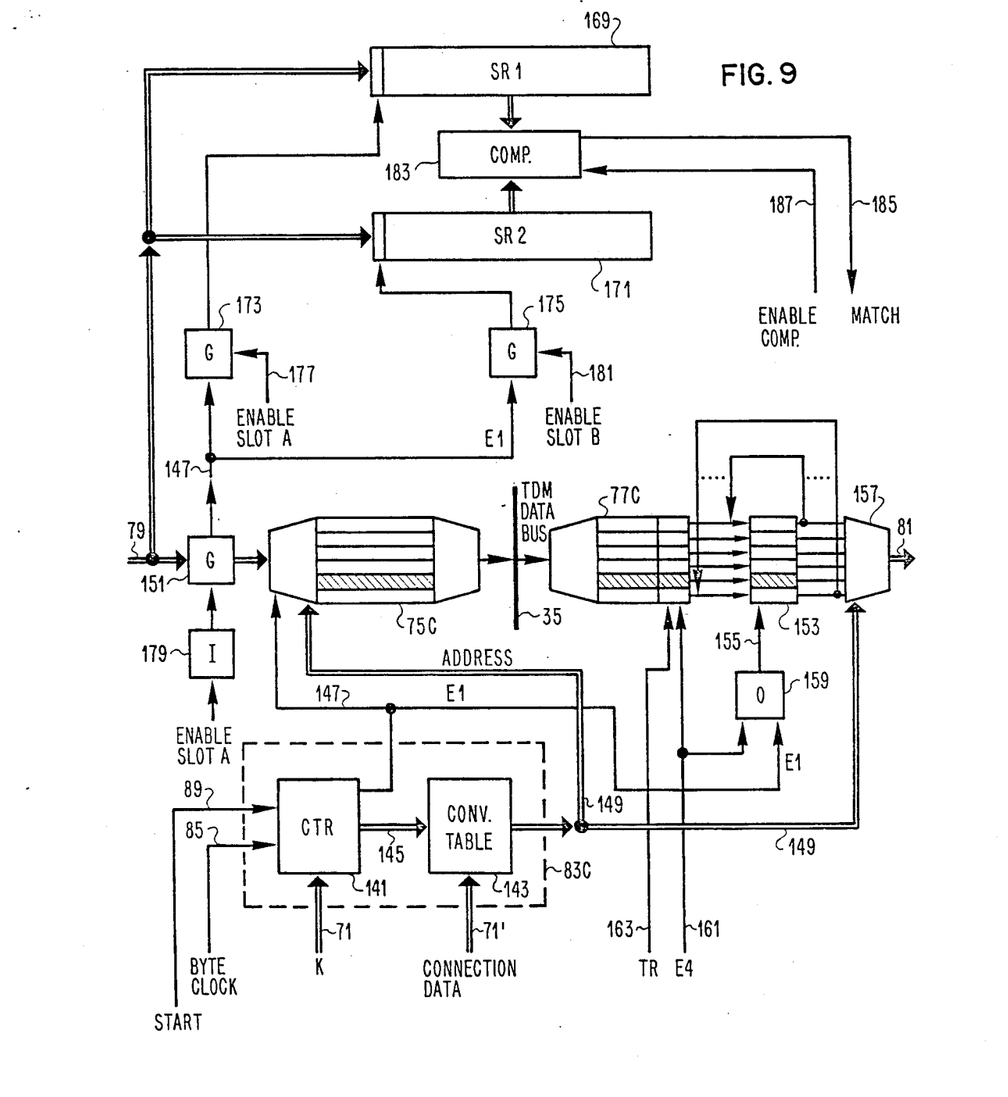
FIG. 9 is a block diagram of a modified buffer array section in an SBM unit of FIG. 4, with access control enabling the slot rearrangement procedure shown in FIG. 8.

For implementing this slot rearrangement procedure, the accessing means for the switching buffers must be somewhat modified, as is shown in FIG. 9. This figure is a modified version of the upper portion of FIG. 5, showing switching buffers 75C and 77C in connection with the PBX data bus 35 and their access control circuitry. Data packets appearing on lines 79 from the ring are written into buffers in array 75C under control of addressing circuitry 83C which includes a counter 141 and conversion table 143. The counter receives a signal "start of voice information field" on line 89 and the ring byte clock on line 85. It furnishes, after the start signal, on lines 145 a sequence of addresses 0 ... K-1 (K corresponding to the current number of voice slots per frame), each address during N byte clock times (N being the number of bytes per voice slot). It further furnishes a continuous sequence of N·K byte clock pulses on line 147 which constitute enable pulses E1 as (also) shown in FIG. 5. The counter receives the value K on lines 71. The conversion table holds the current assignment between voice frame slot numbers and buffer numbers, and issues for each count value received on lines 145 an associated buffer number as address on line 149. The conversion table receives the current assignments on lines 71'.

Operation is as follows: During the stream of voice packets received from the ring in one voice frame on lines 79, the addressing module issues for each packet in sequence the corresponding buffer address (non-sequential order), and buffer array 75C while accessing each buffer inserts therein N bytes (e.g. 32 bytes), i.e. one voice packet.

A gating circuit 151 in lines 79 which is provided for inhibiting the transfer of a voice packet into the buffers in certain situations will be explained later.

The output section of buffer array 77C is modified as shown in the drawing to allow double readout of one packet during slot rearrangement. An array of shift registers 153 is provided, one register per switch buffer in array 77C. Each shift register has a capacity of N bytes (voice samples), i.e. one voice packet. Outputs are connected to inputs to achieve a recirculating operation. Contents of all shift registers are simultaneously shifted by pulses on shift control line 155. The output of each shift register can be selectively gated by an output multiplexer 157 to lines 81 (transfer to the ring). The output of each shift register of array 153 is individually selectable by a selection address which is furnished on lines 149.

Figure 10:
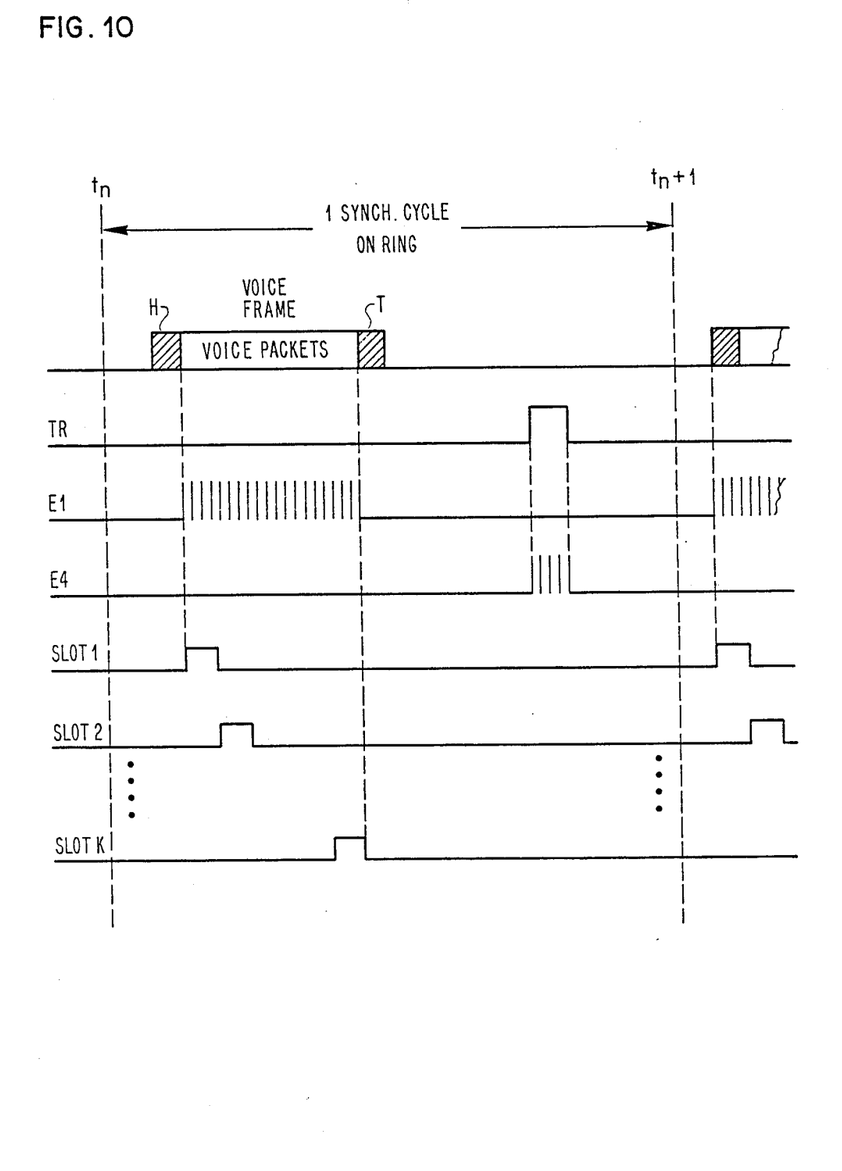
FIG. 10 is a timing diagram of the signals used for voice packet writing, reading, and transfer in the modified buffer array section of FIG. 9.

Shift control line 155 can receive shift pulses through OR gate 159 either from line 147 (E1) or from line 161 (E4). The outputs of all buffers in array 77C can be commonly enabled by a transfer pulse (TR) on line 163. Pulse sequences E1 and E4 and the transfer pulse are shown in FIG. 10.

Operation is as follows: Once in each synchronous ring operation cycle, in the gap between two voice frames, a parallel transfer of one voice packet from each buffer in array 77C to its associated shift register in array 153 is made. This is achieved by a sequence of N shift pulses E4 on line 161 and one pulse TR on line 163 which lasts N byte times (cf. FIG. 10). During the time of a voice frame, pulses E1 appear on line 147 to achieve recirculation of the shift register contents in array 153. During each slot time, one address appears on lines 149 and causes opening of a respective gate in multiplexer 157 so that contents of the associated shift register (153) are transferred to line 81. Thus a continuous stream of voice packets for output to the ring is formed.

Addressing and data transfer for TDM switching over the PBX TDM bus 35 is the same as shown in FIG. 5 and therefore need not be shown and explained here anymore.

To allow the reception of equal packets in two different slots of the same voice frame, and to allow the comparison of packets which were received in two different slots, as is required for present procedure of slot reassignment, further circuitry is required which is shown in the upper portion of FIG. 9.

Two shift registers SR1 and SR2 (169 and 171) are provided and connected with their inputs to lines 79 for receiving voice packets from the ring. For selective write-in of voice packets, under control of the byte clock pulses E1 available on line 147, gates 173 and 175 are provided. Gate 173 receives a signal "enable slot A" on line 177 during the slot time of the free slot (S3) to which the connection is to be shifted so that the contents of this slot is transferred to SR1. Simultaneously, this signal inhibits writing of the voice packet into a switch buffer (through inverter 179 and gate 151). Gate 175 receives a signal "enable slot B" on line 181 during the slot time of the last slot (Sn) so that the contents of this slot is transferred to SR2. A compare circuit 183 is provided for comparing the contents of both shift registers and for issuing a matching signal on line 185. The compare circuit is enabled by a signal "end of voice information field" on line 187.

The signals "enable slot A" and "enable slot B" are provided by the SBM control circuitry during the intervals of the two voice slots which are involved in the slot rearrangement operations (slots 3=A and slot n=B in the example). Cf. also FIG. 10.

The circuitry shown and described allows the shifting of one voice connection from the last frame slot to a free slot (gap). As the shifting (slot rearrangement) procedure takes several synchronous cycles, it may be desirable to shift more than one connection from a slot at the end of the frames to an earlier slot vacated by the release of a connection. To enable such multiple slot shift (rearrangement) operation, the circuitry shown in the upper left of FIG. 9 for voice packet comparison must be provided m times (for m simultaneous slot shift procedures), and m respective different pairs of "enable slot A/B" signals must be furnished.

In each voice station, circuitry similar to that shown in the upper left portion of FIG. 9 is provided, to enable the receiving and comparing of two voice packets from two different slots of the same frame.

(8) TIMING EXAMPLES

The sampling of voice signals for digital transmission occurs every 125 μs (8 kHz). In the embodiment described, voice packets in non-addressed transmission comprise 32 bytes or voice samples. Thus, for each voice connection one packet must be transmitted per 4 ms, or 250 packets per second.

Duration of a voice frame: Assuming that each voice frame contains 30 slots (i.e. 30 voice packets are transmitted per voice frame) the total frame will contain 30×32 voice bytes plus ca. 20 bytes overhead (control fields, addresses etc. in frame header and trailer) which amounts to ca. 1,000 bytes or 8,000 bits per voice frame. Assuming further a transmission speed on the ring of 4 Mbit/s, each voice frame will take about 2 ms.

With a repetition rate of one voice frame per 4 ms, and the voice frame duration of 2 ms, voice frames will occupy half the transmission time on the ring so that the other half of the total transmission time is still available for asynchronous transmission of data (including signaling information).

(9) ALTERNATIVES, MODIFICATIONS (A) Multiplexers for Groups of Stations:

In the example shown, each station was individually connected to the ring by its own ring adapter. It is of course possible to connect a number of voice stations (e.g. eight stations) to a multiplexer which in turn is connected to the ring by a ring adapter. In this case, slot recognition etc. will be done by the multiplexer instead of by the stations. The multiplexer will have the necessary buffers and access tables so that each station needs only provide a continuous stream of voice bytes to the multiplexer, and receive such stream from the multiplexer.

(B) Duplex Transmission:

In the example shown, duplex transmission was achieved insofar as the same voice slot in a voice frame is first used for transmission of voice data from the SBM to the station and thereafter for transfer of other voice data from the station to the SBM. In a modified protocol, a double slot could be provided for each voice connection. The first portion would be used always for transmission outwards (from SBM to station), and the second portion for transmission inwards (from station to SBM). In this protocol, each voice packet returns to its origin (on the ring) for checking purposes.

(C) Assignment of Different Bandwidths

In the example described above, the synchronous frames were all used as voice frames, and one voice slot was provided per connection because all connections were assigned the same bandwidth. There exists of course the possibility of assigning different bandwidths to different stations e.g. for transmitting high quality voice or music etc. This can be achieved easily also in connection with present invention by assigning more than one voice slot to a connection. For example, one station could then use two (or more) consecutive voice slots in each voice frame. Such selective bandwidth assignment is of course also possible (or even mandatory) for synchronous frames which are not used strictly as voice frames but rather for real-time data (in process control applications etc.). While preferred embodiments have been illustrated and described herein, it will be obvious that numerous modifications, changes, variations, substitutions and equivalents in whole or in part, will now occur to those skilled in the art without departing from the spirit and scope contemplated by the invention.

What is claimed is:

1. A communications system having at least one transmission facility in which data are transmitted in asynchronously circulating frames, in which access to said at least one transmission facility is regulated by a token, and in which a priority token for marking a priority frame is released at quasi-regular intervals by a synchronous bandwidth manager (SBM) unit provided for said at least one transmission facility, characterized in that for transmission and switching of information blocks requiring synchronous transfer:

a common time division multiplex (TDM) switching unit is provided and is connected to the transmission facility by a SBM unit (57); said SBM unit includes means (61 . . . 73, 79 . . . 89) for extracting all information blocks from each priority frame and for inserting them into buffers (75) readable by said TDM switching unit, and for extracting information blocks from buffers (77) writable from said TDM switching unit and inserting them into priority frames it transmits on its associated transmission facility, each said priority frame having a plurality of time slots (V1 . . . Vn) for information blocks; and that each station which participates in the exchange of information blocks requiring synchronous transfer, has means (101 . . . 109) for receiving such an information block from, and transmitting such an information block in, at least one predetermined slot of each said priority frame.

2. System in accordance with claim 1, characterized in that it comprises a plurality of token rings (11) interconnected by PBX switching unit (21), and that a backbone bus or ring (17) is provided which additionally interconnects all said token rings via bridges (19) for the exchange of addressed data packets which are transferred in asynchronous non-priority frames.

3. System in accordance with claim 1, characterized in that each SBM unit (57) comprises at least one buffer array (75, 77) including one input and one output buffer for each synchronous connection possible on the respective ring; and means 69, 71; 83 ... 89) for accessing each said buffer to insert into it or extract from it an information block received from, or to be transmitted in, a predetermined, temporarily assigned slot in each said priority frame on the respective ring.

4. System in accordance with claim 3, characterized in that each said information block includes a connection identification number (CID); that said means for accessing means include means (97) for attaching to each information block a respective connection identification number corresponding to the address of the accessed buffer in a buffer array (77B), and means (95) for converting an identification number received with an information block, into an address for accessing a buffer in a buffer array (75B).

5. System in accordance with claim 3, characterized in that said PBX switching unit (21) comprises control means (31, 37, 39) and a transfer bus (35) to which each SBM unit (57) is connected, enabling independent access to each of said buffers in said at least one buffer array (75, 77) for extracting or inserting, respectively, elementary portions of said information blocks which are released to, or received from, said transfer bus, to thus achieve a time division multiplex interchange of information block elementary portions among SBM units or between SBM units and other units attached to said PBX switching unit.

6. System in accordance with claim 3, characterized in that the number of time slots (V1 ... Vn) in each said priority frame transmitted by each said SBM unit (57) is adapted to the number of synchronous information blocks currently to be transmitted on the respective ring which corresponds to the number of existing synchronous connections in said ring.

7. System in accordance with claim 1, characterized in that each station comprises means (119) for assembling individual basic information units received from an attached device (111) at a regular rate into information blocks, and for transferring each such information block into a transmit buffer (105) of the respective station, and means (121) for disassembling information blocks received from a receive buffer (107) of the respective station, into individual basic information units, and for transferring them at said regular rate to said device.

8. System in accordance with claim 1 or 3, characterized in that each SBM unit (57) includes means (153 .. .. 159; 169 ... 187) for transmitting an information block from a selectable buffer in a buffer array (77C), in two different slots of each said priority frame, and for receiving and comprising the information blocks received in two different slots of each said priority frame, but transferring only one of them into an assigned buffer in a buffer array (75C), to enable the duplicate transfer of information blocks in two slots of each said priority frame for achieving a reassignment of slots for one synchronous connection.

9. System in accordance with claim 3, characterized in that said accessing means (83A) includes address counting means for sequentially accessing said buffers in arrays (75A ... 77A) during reception and transmittal of each said priority frame, resulting in a fixed assignment between buffers in said buffer arrays and slots in priority frames.

10. A communication system comprising at least one token ring (11) which is interconnected to a PBX unit (21) by a synchronous bandwidth manager (SBM) unit (57) issuing priority frames for synchronous information transfer at quasi-synchronous intervals, and in which system information blocks for each specific connection are inserted in and extracted from at least one predetermined slot in each priority frame by the SBM unit (57) and the respective station (13) involved, characterized in that the SBM unit and each station comprise means (151 ... 159; 169 ... 187) for using temporarily two slots in each said priority frame for transferring the same synchronous information block in duplicate, for comparing the information blocks received in both said slots, and for changing transmission and reception of information blocks from the one of said slots which was previously used for the respective connection, to the other slot when information blocks were received identically in both slots a predetermined number of times.

11. System in accordance with claim 10, characterized in that the two slots which are used temporarily for duplicate transmission are the last slot of each frame and a slot that was left unassigned due to the release of a connection for which the respective slot was used previously, to enable changing of transmission for one connection from the last slot of each priority frame to an unassigned slot.

12. System in accordance with claim 1, characterized in that the number of time slots (V1 ... Vn) in each said priority frame transmitted by each said SBM unit (57) is adapted to the number of synchronous information blocks currently to be transmitted on the respective transmission facility which corresponds to the number of existing synchronous connections in said transmission facility.

13. A method of slot rearrangement in a system in which information for a specific connection is transmitted between first and second units in predetermined slots of transmission frames comprising the steps of:
  transmitting and receiving identical information from units using the last slot in a transmission frame, said identical information transmitted and received in both said last slot and a free slot wherein said free slot results from the release of a connection;
  testing whether identical information is received in both said slots for a predetermined number of times;
  switching said first and second units so as they use only said free slot wherein said last slot of each transmission frame remains unused and future transmission frames can be issued with a reduced length.

14. A method in accordance with claim 13, including the step of:
  executing in a time shifted manner the operations of duplicate transmission checking and switchover by said two respective units;
  transmitting from said first unit identical information in both slots while said second unit checks correct reception for a predetermined number of times and then switches over to receiving and transmitting only in said free slot, whereupon said first unit also switches over to receiving and transmitting only in said free slot.

15. The method set forth in claim 13 further including the steps of:
transmitting from said first unit identical information in both slots while said second unit checks correct reception for a predetermined number of times;
transmitting from said second unit identical information in both slots while said first unit checks correct reception for a predetermined number of times; and
thereafter said first and second units switching over to transmit and to receive in only said free slot.

* * * * *